United States Patent [19]

Tamura et al.

[11] Patent Number: 5,035,823
[45] Date of Patent: Jul. 30, 1991

[54] REFRIGERANT COMPOSITIONS OF 1,11-TRIFLUOROETHANE

[75] Inventors: Koji Tamura, Kawanishi; Hiroshi Kashiwagi, Settsu; Masahiro Noguchi, Osaka, all of Japan

[73] Assignee: Daikin Industries, Ltd., Osaka, Japan

[21] Appl. No.: 362,385

[22] PCT Filed: Sep. 21, 1988

[86] PCT No.: PCT/JP88/00952
§ 371 Date: May 19, 1989
§ 102(e) Date: May 19, 1989

[87] PCT Pub. No.: WO89/02456
PCT Pub. Date: Mar. 23, 1989

[30] Foreign Application Priority Data

Sep. 21, 1987 [JP] Japan .................. 62-238441

[51] Int. Cl.$^5$ .................................. C09K 5/04
[52] U.S. Cl. ............................. 252/67; 62/114
[58] Field of Search ................. 252/67; 62/114

[56] References Cited

U.S. PATENT DOCUMENTS

| 3,377,287 | 4/1968 | Kvalnes et al. | 252/67 |
| 4,224,795 | 9/1980 | Stiel et al. | 252/67 |
| 4,303,536 | 12/1981 | Orfeo et al. | 252/67 |
| 4,810,403 | 3/1989 | Bivens et al. | 252/67 |

FOREIGN PATENT DOCUMENTS

| 63-305185 | 12/1988 | Japan | 252/67 |
| 63-308084 | 12/1988 | Japan | 252/67 |
| 63-308085 | 12/1988 | Japan | 252/67 |

OTHER PUBLICATIONS

*Research Disclosure*, Abstract 15402, "Hydrogen-Containing Chlorofluorocarbons as Refrigerants", Feb. 1977.

Primary Examiner—Paul Lieberman
Assistant Examiner—Christine A. Skane
Attorney, Agent, or Firm—Larson and Taylor

[57] ABSTRACT

The present invention provides a refrigerant comprising 1,1,1-trifluoroethane and either chlorotetrafluoroethane or tetrafluoroethane.

3 Claims, 2 Drawing Sheets

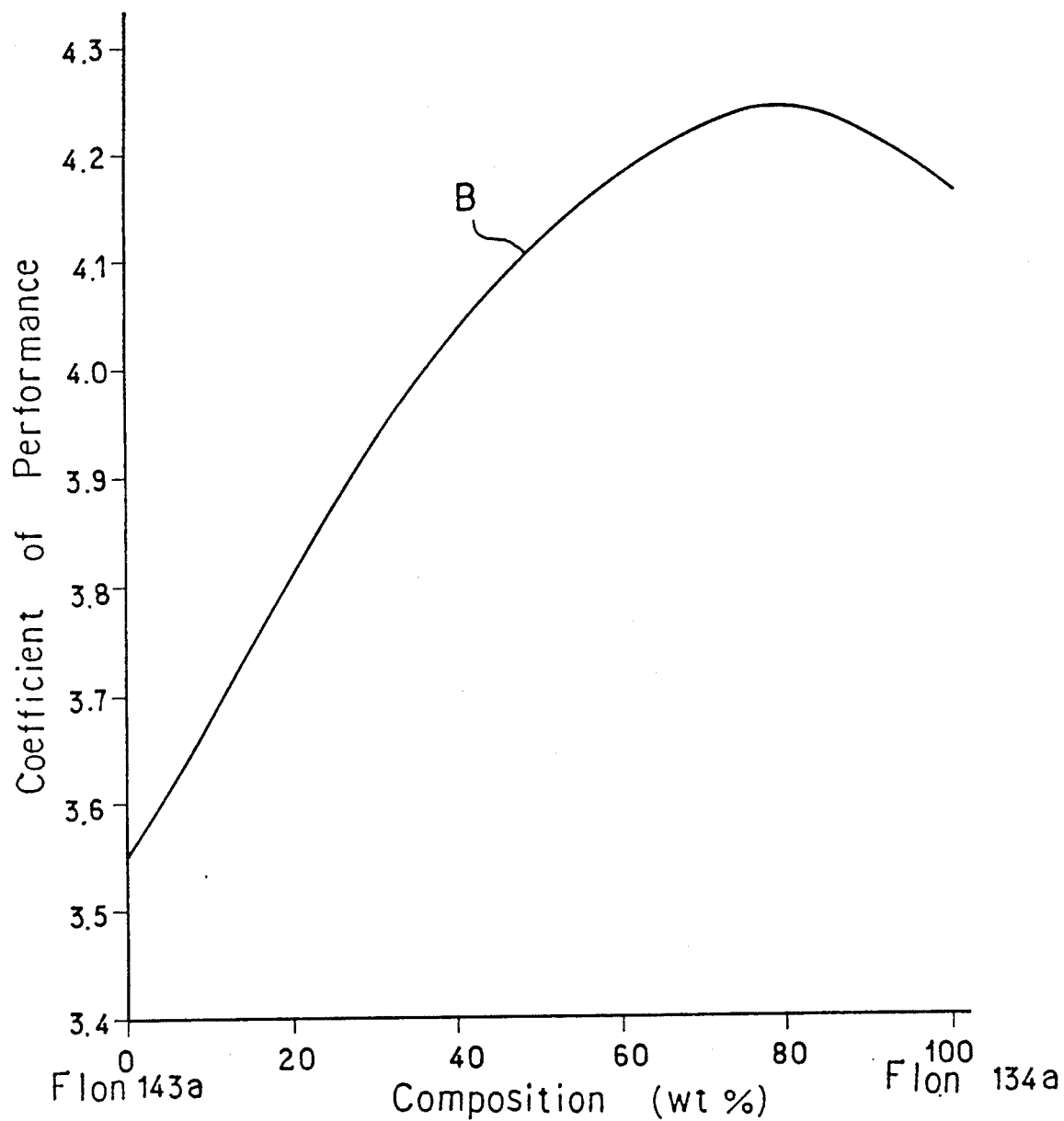

REFRIGERANT COMPOSITIONS OF 1,1,1-TRIFLUOROETHANE

TECHNICAL FIELD

This invention relates to a working fluid for a refrigerator, which is called a refrigerant.

PRIOR ART AND PROBLEMS THEREOF

Refrigerants heretofore known include chlorofluoroalkanes, fluoroalkanes, azeotropic compositions thereof and other materials having a similar composition. These are generally called flons or flon refrigerants. Among them, chiefly used at present are dichlorodifluoromethane (hereinafter referred to as "Flon-12"), chlorodifluoromethane (hereinafter called "Flon-22") and the like. In recent years, however, it has been pointed out that certain kinds of flons released into the atmosphere would destroy the stratospheric ozone layer, thereby inflicting a serious adverse influence on the ecosystem including humans on the earth. Although said proposition may have yet to be scientifically and completely established, there is a tendency toward the control, under an international agreement, of use and production of flons which are likely to destroy the ozone layer. The flons to be controlled include Flon-12. With the spread of refrigerators and air-conditioning systems, the control over the use and production of flons, which are in greater demand year after year, greatly affects our residential environment and the current social framework as a whole. In consequence, there is an urgent demand for development of refrigerants having a high refrigerating performance, particularly a high coefficient of performance. It may be possible to offer 1,1,1-trifluoroethane (Flon-143a) as flons free of ozone layer-destroying risks but has the defect of being low in coefficient of performance.

The term "coefficient of performance" used herein means the ratio of refrigerating capacity to compressing work. The refrigerating capacity is the quantity of heat removed per a unit time from the substances being cooled, and the compressing work is the work volume achieved per a unit time by power for operating the refrigerator. Accordingly the coefficient of performance corresponds to the refrigeration efficiency of the refrigerant.

Means for Solution of the Problems

We conducted extensive research to develop novel refrigerants which have a high coefficient of performance and which, when released into the atmosphere, would exert little influence on the ozone layer. Our research revealed that a refrigerant comprising 1,1,1-trifluoroethane (Flon-143a) and chlorotetrafluoroethane or tetrafluoroethane can exhibit a higher coefficient of performance than Flon-143a.

The present invention, therefore, provides a refrigerant comprising 1,1,1-trifluoroethane and either chlorotetrafluoroethane or tetrafluoroethane.

BRIEF DESCRIPTION OF THE DRAWINGS

FIGS. 1 and 2 show graphs illustrating the refrigerating performance of the refrigerants according to the present invention.

CONSTRUCTION OF THE INVENTION

Figure 1:
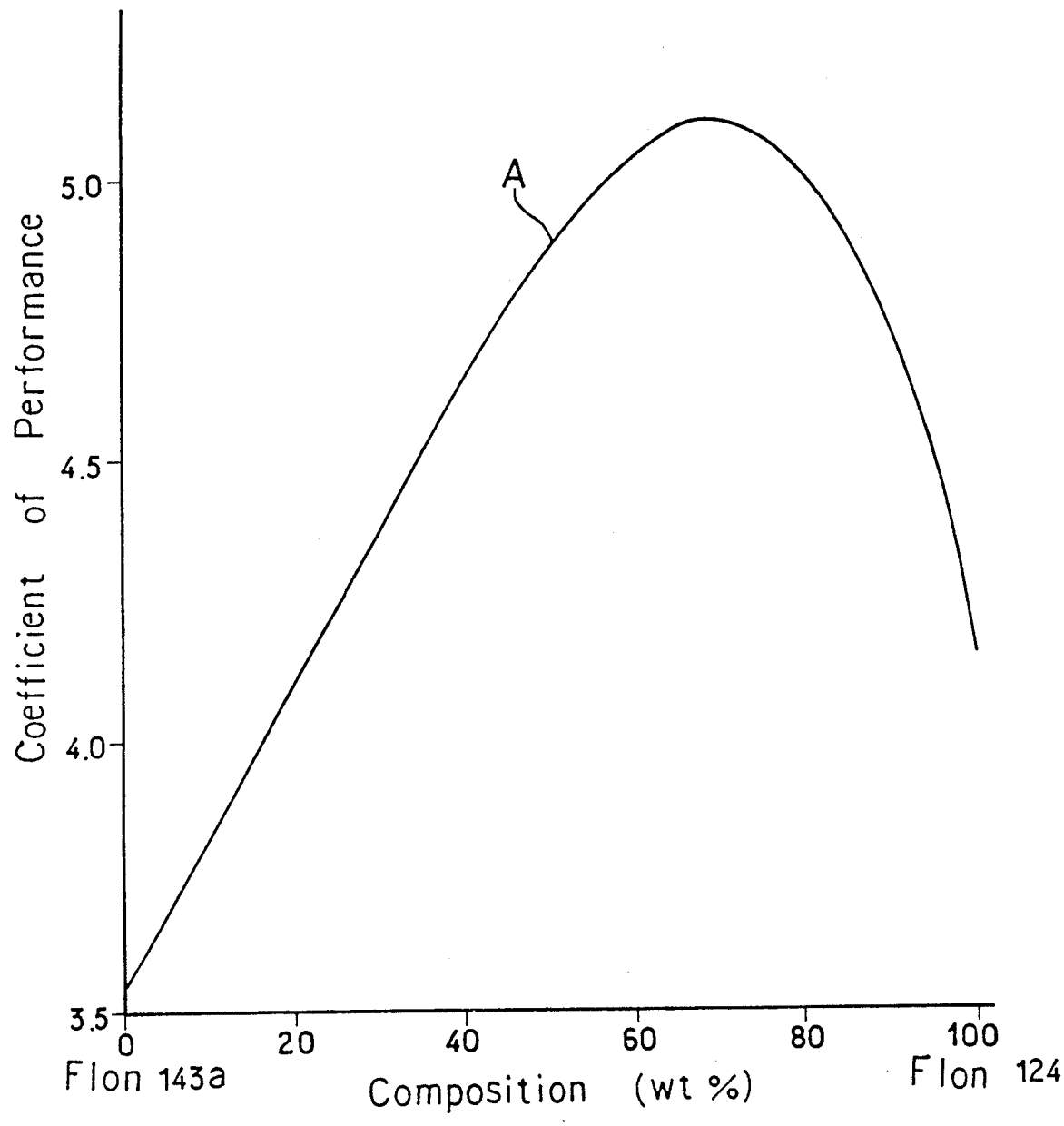

Preferred refrigerant compositions of the invention are those comprising 90 to 5% by weight of 1,1,1-trifluoroethane and 10 to 95% by weight of either chlorotetrafluoroethane or tetrafluoroethane. Refrigerants containing chlorotetrafluoroethane or tetrafluoroethane in the foregoing ratio have a noticeably improved coefficient of performance compared with Flon-143a singly used. A particularly preferable mixing ratio is as follows. Of refrigerants composed of Flon-143a and chlorotetrafluoroethane, preferred are those comprising 70 to 5% by weight of the former and 30 to 95% by weight of the latter. Of refrigerants composed of Flon-143a and tetrafluoroethane, preferred are those comprising 40 to 5% by weight of the former and 60 to 95% by weight of the latter.

Examples of chlorotetrafluoroethane for use in the invention are 2-chloro-1,1,1,2-tetrafluoroethane (Flon-124) and 1-chloro-1,1,2,2-tetrafluoroethane (Flon-124a). Examples of tetrafluoroethane for use herein are 1,1,1,2-tetrafluoroethane (Flon-134a) and 1,1,2,2-tetrafluoroethane (Flon-134). Among the compositions of the invention, Flon-124 and Flon-124a can achieve a similar degree of effect and thus can be replaced by each other or mixed with each other in use. This can be done in respect of Flon-134a and Flon-134.

RESULTS AND EFFECTS OF THE INVENTION

The refrigerants of the invention are smaller in the ratio of specific heat and lower in the temperature of gas discharged from the compressor than Flon-22 and are consequently suitable for use as a cooling medium for a refrigeration cycle using a relatively high temperature as in an air-conditioning equipment of the heat pump type.

The composition of the invention is a non-azeotropic composition. Generally a single compound or an azeotrope is vaporized at a constant temperature in an evaporator because of its evaporation done under constant pressure, whereas a non-azeotropic composition has a low temperature at the inlet of the evaporator and a high temperature at the outlet thereof. On the other hand, a fluid to be cooled is caused to flow in countercurrent to the refrigerant in the evaporator to undergo heat exchange and thus has a temperature gradient along the flow direction even if the refrigerant is vaporized at a constant temperature. In other words, a temperature difference between the refrigerant and the fluid to be cooled diminishes in the evaporator as the fluid flows forwardly. In use, the refrigerant of the non-azeotropic composition according to the invention can be rendered close in temperature to the temperature gradient of the fluid to be cooled in the evaporator, so that the refrigeration efficiency, namely the coefficient of performance, can be enhanced.

EXAMPLES

The features of the present invention will be clarified below with reference to the following Examples and Comparison Example.

EXAMPLES 1 TO 6 AND COMPARISON EXAMPLE 1

Refrigerants were prepared by mixing together Flon-143a and Flon-124 in the various proportions shown below in Table 1 (weight ratio).

TABLE 1

|  | Flon-143a | Flon-124 |
|---|---|---|
| Comp. Example 1 | 100 | 0 |

TABLE 1-continued

|  | Flon-143a | Flon-124 |
|---|---|---|
| Example 1 | 90 | 10 |
| Example 2 | 80 | 20 |
| Example 3 | 60 | 40 |
| Example 4 | 40 | 60 |
| Example 5 | 20 | 80 |
| Example 6 | 5 | 95 |

A refrigerator was operated with an output of 1 hp. using the refrigerants of the composition shown in Table 1. Each refrigerant started condensation at 50° C. in a condenser and had a temperature of 0° C. in the inlet of the evaporator with superheat of 5° C. Table 2 below shows (I) the maximum evaporating temperature (°C.), (II) refrigerating capacity (kcal/m$^3$), (III) coefficient of performance and (IV) discharge temperature (°C) at the compressor.

Table 2 also shows the results achieved by using Flon-143a alone (Comparison Example 1).

TABLE 2

|  | Maximum evaporating temperature (°C.) (I) | Refrigerating capacity (kcal/m$^3$) (II) | Coefficient of performance (III) | Discharge temperature (°C.) (IV) |
|---|---|---|---|---|
| Comp. Example 1 | 0.0 | 647 | 3.55 | 62.9 |
| Example 1 | 1.7 | 636 | 3.82 | 62.2 |
| Example 2 | 3.3 | 621 | 4.09 | 61.2 |
| Example 3 | 5.7 | 578 | 4.64 | 58.8 |
| Example 4 | 6.8 | 509 | 5.03 | 56.1 |
| Example 5 | 5.6 | 401 | 4.99 | 53.3 |
| Example 6 | 2.0 | 293 | 4.47 | 50.8 |

FIG. 1 indicates a graph illustrating the relationship between the proportions of Flon-143a and Flon-124 and the coefficient of performance (curve A).

Table 2 and FIG. 1 reveal that the refrigerants of the present invention have outstanding properties.

EXAMPLES 7 TO 12

The properties of refrigerants were investigated in the same manner as in Examples 1 to 6 with the exception of using the refrigerants prepared by mixing together Flon-143a and Flon-134a in the various proportions (weight ratio) shown below in Table 3.

TABLE 3

|  | Flon-143a | Flon-134a |
|---|---|---|
| Example 7 | 90 | 10 |
| Example 8 | 80 | 20 |
| Example 9 | 60 | 40 |
| Example 10 | 40 | 60 |
| Example 11 | 20 | 80 |
| Example 12 | 5 | 95 |

Table 4 shows (I) the maximum evaporating temperature (°C), (II) refrigerating capacity (kcal/m$^3$), (III) coefficient of performance and (IV) discharge temperature (°C) at the compressor in respect of the refrigerants.

FIG. 2 indicates a graph illustrating the relationship between the proportions of Flon-143a and Flon-134a and the coefficient of performance (curve B).

TABLE 4

|  | Maximum evaporating temperature (°C.) (I) | Refrigerating capacity (kcal/m$^3$) (II) | Coefficient of performance (III) | Discharge temperature (°C.) (IV) |
|---|---|---|---|---|
| Example 7 | 0.6 | 640 | 3.68 | 62.8 |
| Example 8 | 1.1 | 630 | 3.81 | 62.8 |
| Example 9 | 1.8 | 602 | 4.04 | 62.4 |
| Example 10 | 2.0 | 561 | 4.18 | 62.2 |
| Example 11 | 1.5 | 508 | 4.24 | 61.8 |
| Example 12 | 0.5 | 458 | 4.19 | 61.7 |

We claim:

1. A working fluid for refrigerator consisting essentially of 90 to 5% by weight of 1,1,1-trifluoroethane and respectively 10 to 95% by weight of either chlorotetrafluoroethane or tetrafluoroethane.

2. A working fluid according to claim 1 which consists essentially of 70 to 5% by weight of 1,1,1-trifluoroethane and respectively 30 to 95% by weight of chlorotetrafluoroethane.

3. A working fluid according to claim 1 which consists essentially of 40 to 5% by weight of 1,1,1-trifluoroethane and respectively 60 to 95% by weight of tetrafluoroethane.

* * * * *